US012809598B2

(12) United States Patent
Kodali et al.

(10) Patent No.: US 12,809,598 B2
(45) Date of Patent: Nov. 24, 2026

(54) SYSTEM AND METHOD FOR BUILDING PROGRAMS

(71) Applicant: Accenture Global Solutions Limited, Dublin (IE)

(72) Inventors: Rekha Kodali, Bangalore (IN); Venkata Guru Prasad Kandarpi, Bangalore (IN); Prakash Ghatage, Bangalore (IN); S Banu Priya, Bangalore (IN); Ravi Kant Gaur, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 308 days.

(21) Appl. No.: 18/811,552

(22) Filed: Aug. 21, 2024

(65) Prior Publication Data

US 2026/0056719 A1 Feb. 26, 2026

(51) Int. Cl.
*G06F 8/36* (2018.01)
*G06F 8/10* (2018.01)

(52) U.S. Cl.
CPC . *G06F 8/36* (2013.01); *G06F 8/10* (2013.01)

(58) Field of Classification Search
CPC .................................... G06F 8/10; G06F 8/36
USPC .................................................. 717/106–121
See application file for complete search history.

(56) References Cited

U.S. PATENT DOCUMENTS

| | | | | |
|---|---|---|---|---|
| 7,546,575 | B1 * | 6/2009 | Dillman | G06F 8/10 717/102 |
| 8,903,711 | B2 * | 12/2014 | Lundberg | G06F 11/3698 704/8 |
| 8,943,010 | B2 * | 1/2015 | Hutson | G06F 8/61 706/46 |
| 10,318,248 | B2 * | 6/2019 | Abebe | G06F 8/30 |
| 11,113,310 | B2 * | 9/2021 | Jalla | G06F 30/13 |
| 11,537,871 | B2 * | 12/2022 | Montantes | G06F 3/013 |
| 12,164,887 | B2 * | 12/2024 | Kadam | G06F 8/30 |
| 12,293,167 | B2 * | 5/2025 | Ghosh | G06F 8/316 |
| 12,353,854 | B2 * | 7/2025 | Sikand | G06F 8/36 |

OTHER PUBLICATIONS

Bingyang Wei, "Requirements are All You Need: From Requirements to Code with LLMs", 2024, arXiv, 7 pages. (Year: 2024).*

* cited by examiner

*Primary Examiner* — Ted T. Vo
(74) *Attorney, Agent, or Firm* — Seed Intellectual Property Law Group LLP

(57) ABSTRACT

Methods, systems, and non-transitory computer readable media for building a program using a Gen AI model. For building the program, first information including at least functional features and technical features to consider are received. Based on the first information, a list of requirements to create the program with at least one solution for each requirement is determined. Based on the list of requirements, a plurality of solution combinations are identified, checked for avoiding conflict, and assessed based on weighting assigned to the requirements, such that the solution combinations include solutions from higher weighted requirements and exclude conflicting solutions from lower weighted requirements. Based on identified plurality of solution combinations, a particular solution combination is selected. For running the program, an order of application of solutions within the particular solution combination is selected, the program is created from the solutions in the selected order, and the program is run.

20 Claims, 9 Drawing Sheets

SYSTEM AND METHOD FOR BUILDING PROGRAMS

FIELD OF THE INVENTION

The present disclosure generally relates to the field of automation and building programs, and more particularly to a system and a method for building a program (or, programs) using a foundation model.

BACKGROUND

In contemporary software development, enterprises heavily rely on intricate software applications to enhance operational efficiency and productivity. The involvement of subject matter experts in crafting precisely tailored and efficient software configurations is crucial as organizations strive to maintain competitiveness and adaptability in a rapidly evolving digital environment. This reliance underscores the ongoing challenge of balancing complexity with scalability and sustainability.

SUMMARY

Implementations of the present disclosure are generally directed to building programs using a generational artificial intelligence (GenAI) model. Based on user provided functional and technical requirements for creating a program, the Gen AI model is utilized to identify possible solutions for each requirement for building the program. It then assesses multiple solution combinations to ensure that they are compatible and do not conflict. If no non-conflicting combinations are found, the model uses a weighted approach to prioritize solutions based on their importance, selecting those associated with higher-weighted requirements while excluding conflicting options from lower-weighted ones. The chosen solutions are organized and applied in a specified order to create and execute the program. This effectively addresses the complexities of solution selection and conflict resolution, improving the overall efficiency and accuracy of the program development process.

The proposed system and method improve program development by using a Generative AI model. The method includes receiving first information with functional and technical features. The Generative AI model determines a list of requirements and identifies a plurality of solution combinations for these requirements. It first identifies combinations where solutions do not conflict. If no such combinations are identified, the model then identifies solution combinations based on weighting assigned to the requirements, favoring combinations with solutions from higher-weighted requirements and excluding conflicting solutions from lower-weighted requirements. The method includes selecting a particular solution combination, determines the order of application, creates the program from the selected solutions, and runs the program. This approach optimizes the process of program development by addressing solution conflicts and ensuring effective implementation.

The present disclosure further describes a system for building and running the program. The present disclosure also describes non-transitory processor readable storage medium coupled to one or more processors and having instructions stored thereon which, when executed by the one or more processors, cause the one or more processors to perform operations in accordance with the method described herein.

It is appreciated that methods in accordance with the present disclosure can include any combination of the aspects and features described herein. That is, the method in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DRAWINGS

Various embodiments in accordance with the present disclosure will be described with reference to the drawings, in which.

Like reference numbers and designations in the various drawings indicate like elements.

DETAILED DESCRIPTION

Figure 1:
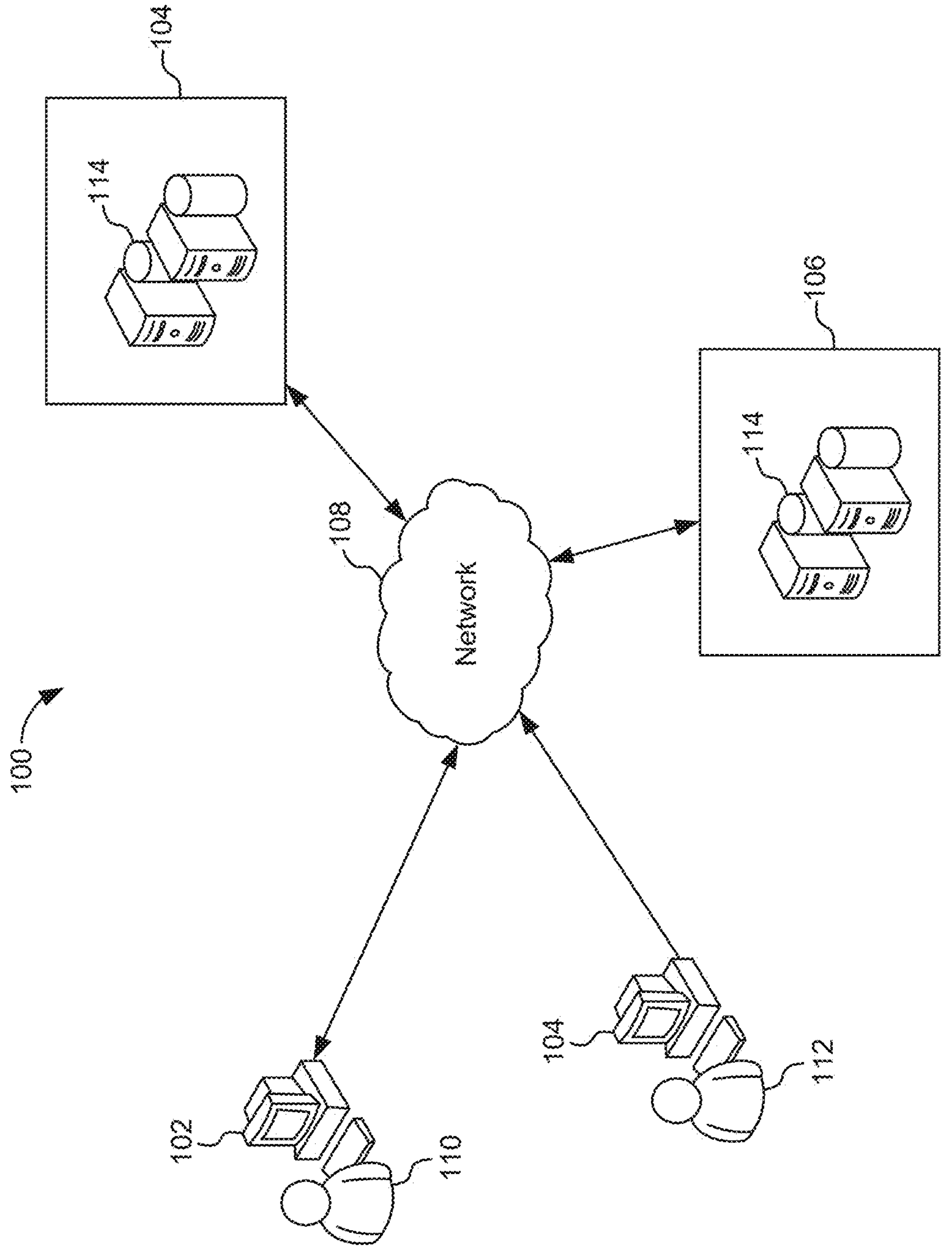
FIG. 1 depicts an example environment that may be used to execute implementations of the present disclosure.

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope of the claimed subject matter.

Reference to any "example" herein (e.g., "for example," "an example of," by way of example" or the like) are to be considered non-limiting examples regardless of whether expressly stated or not.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any exemplified term. Likewise, the disclosure is not limited to various embodiments given in this specification.

Without intent to limit the scope of the disclosure, examples of instruments, apparatus, systems, methods, and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

The term "comprising" when utilized means "including, but not necessarily limited to"; it specifically indicates open-ended inclusion or membership in the so-described combination, group, series, and the like.

The term "a" means "one or more" unless the context clearly indicates a single element.

"First," "second," etc., are labels to distinguish components or blocks of otherwise similar names but does not imply any sequence or numerical limitation.

"Create," construct," build" or the like in the context of a program covers both the creation of new programs as well as modification of existing programs.

"Functional" features refer to specific functions that the program is to provide. Examples of functional requirements include filtering capability, user choice capabilities for each category, product characteristics inclusion, add to cart functionality, personalized recommendation capability, cart verification capability, account creation and sign in capability, user account facilities for resetting passwords and change account details, user feedback capability, order status tracking capability, and the like.

"Non-functional" or "technical" features refer to operating parameters of the program. Examples of the technical features or requirements include scalability, maintainability, performance, portability, security, reliability, usability, sustainability, and the like. Specific functionalities are required for each of the technical features. For example, for a technical requirement of 'useability,' such functionalities may include browser accessible capability, easy to use, easy navigation capability, simple user-friendly feature capability, and the like. Similarly, for 'performance,' such functionalities may include quick checkout capability, for 'security,' the functionalities may include account creation, password generation, account locking, and similar capabilities.

For 'portability', the functionalities may include leveraging cloud containers, effective functioning on multiple devices, and the like; for 'compatibility', the functionalities may include operability across different hardware and operating systems; for 'reliability', the functionalities may include low amount of critical failures, quick recovery capability; for 'availability', the functionalities may include availability, low failure based on traffic, and the like; for 'maintainability', the functionalities may include low mean time for restoration following failure; and for 'observability', the functionalities may include logging capabilities.

"And/or" for two possibilities means either or both of the stated possibilities ("A and/or B" covers A alone, B alone, or both A and B take together), and when present with three or more stated possibilities means any individual possibility alone, all possibilities taken together, or some combination of possibilities that is less than all of the possibilities. The language in the format "at least one of A . . . and N" where A through N are possibilities means "and/or" for the stated possibilities (e.g., at least one A, at least one N, at least one A and at least one N, etc.).

It should also be noted that in some alternative implementations, the functions/acts noted may occur out of the order noted in the figures. For example, two steps disclosed or shown in succession may in fact be executed substantially concurrently or may sometimes be executed in the reverse order, depending upon the functionality/acts involved.

Specific details are provided in the following description to provide a thorough understanding of embodiments. However, it will be understood by one of ordinary skill in the art that embodiments may be practiced without these specific details. For example, systems may be shown in block diagrams so as not to obscure the embodiments in unnecessary detail. In other instances, well-known processes, structures, and techniques may be shown without unnecessary detail in order to avoid obscuring example embodiments.

The specification and drawings are to be regarded in an illustrative rather than a restrictive sense. It will, however, be evident that various modifications and changes may be made thereunto without departing from the broader spirit and scope of the invention as set forth in the claims.

In contemporary software development, enterprises heavily rely on intricate software applications to enhance operational efficiency and productivity. The involvement of subject matter experts in crafting precisely tailored and efficient software configurations is crucial as organizations strive to maintain competitiveness and adaptability in a rapidly evolving digital environment. This reliance underscores the ongoing challenge of balancing complexity with scalability and sustainability.

A technical problem with traditional methods of program building from functional and non-functional features is that it relies upon human subjectively, which often lacks historical context or accounts for future concerns. A human's subjective assessment of the "best" option may, in fact, not be accurate. By way of example, a program may be operable at the moment but not account for scalability and prove inadequate when the environment scales. Human subjectivity can also fail to account for conflicts between code sections meant to address different requirements of the program. Over time, the inefficiently developed programs become more difficult to operate and maintain and can require extensive additional effort to upgrade or cooperate with newly added features.

In presently available solutions, architectural design and development tools are being utilized, intended to provide optimized solutions, architectures, and APIs during both design and runtime phases, aiming to streamline development processes and enhance system performance. However, these tools typically fall short in delivering such optimal recommendations, leading to inefficiencies in development practices and increased maintenance costs. Flawed architectural decisions and design principles consequently contribute to elevated expenses and complexity. The resultant architecture often lacks clarity, making it challenging to incorporate new features and necessitating significant effort to address and rectify existing issues within the codebase.

The difficulties associated with evolvability, and extensibility are particularly pronounced under these conditions, where addressing architectural deficiencies requires considerable and time-consuming efforts. In the absence of a comprehensive architectural redesign, recommendations for hardware upgrades or bandwidth expansions offer only provisional relief and fail to provide enduring benefits. Additionally, implementing code-level modifications within an obsolete architecture is both laborious and protracted, presenting significant challenges for contemporary developers who may be unfamiliar with legacy systems. These limitations underscore the urgent need for dynamic and adaptable architectural frameworks that support continuous development and facilitate the seamless integration of new features.

In view of this, implementations of the present disclosure utilize a Generative AI model to streamline program development by processing functional and technical features. The method involves receiving initial requirements, generating a list of solutions, and identifying non-conflicting solution combinations. If such combinations are not found, the model prioritizes solutions based on weighted requirements, selecting, and ordering them for program creation. This approach enhances the efficiency and accuracy of program development, addressing solution conflicts and optimizing the overall process.

FIG. 1 depicts an example environment 100 that may be used to execute implementations of the present disclosure. In some examples, the example environment 100 enables creating and running a program.

As depicted in FIG. 1, the example environment 100 includes computing devices 102 and 104, back-end systems 106, and a network 108. In some examples, the computing devices 102 and 104 are used by respective users 110 and 112 to log into and interact with computing platforms executing applications according to implementations of the present disclosure. Examples of the computing devices 102 and 104 may include desktop computing devices, smartphones, laptops, tablet, voice-enabled devices, and/or the like.

It is contemplated that implementations of the present disclosure may be realized with any appropriate type of computing device. In some examples, each of the computing devices 102 and 104 may include a web browser application executed thereon, which may be used to display one or more web pages of a computing platform executing applications. In some examples, each of the computing devices 102 and 104 may display one or more Graphical User Interfaces (GUIs) that enable the respective users 110 and 112 to interact with the computing platform.

In some examples, the network 108 includes a Local Area Network (LAN), a Wide Area Network (WAN), the Internet, or a combination thereof, and connects web sites, the computing devices 102 and 104, and the back-end systems 106. In some examples, the network 108 may be accessed over a wired and/or a wireless communication link. For example, a computing device like smartphone may utilize a cellular network to access the network 108.

In some examples, one or more of the back-end systems 106 may be implemented as an on-premises system that is operated by an enterprise or a third-party engaged in cross-platform interactions and data management. In some examples, the back-end systems 106 may be implemented as an off-premises system (for example: cloud or on-demand) that is operated by an enterprise or a third-party on behalf of an enterprise. In some examples, one or more of the back-end systems 106 may be implemented in a cloud environment. For simplicity, the back-end systems 106 depicted in FIG. 1 may be a cloud environment that is intended to represent various forms of servers including a web server, an application server, a proxy server, a network server, a server pool, and/or the like.

In some examples, each of the back-end systems 106 includes one or more systems 114 to host components for building the program. Further, the system 114 accepts requests from the users 110 and 112 through the respective computing devices 102 and 104 for services being provided by the system 114. In response to the accepted requests, the system 114 provides the requested services to the computing devices 102 and 104 over the network 108.

The requests received from the users 110 and 112 through the respective computing devices 102 and 104 may be user queries. The system 114 may enable a foundation model to accurately retrieve information, thereby generating accurate responses for responding to queries by the users 110 and 112. The interaction between the system 114 and users 110, 112 may be conversational in nature, including conversational queries as well as conversational responses to the queries.

According to implementations of the present disclosure, the system 114 may be adapted for building the program automatically based on user inputs. Advantageously, the program development process is streamlined by leveraging the Generative AI model to identify and prioritize solution combinations. Numerous examples demonstrating the adaptation of the system 114 for optimizing program creation are described in the following sections.

Figure 2:
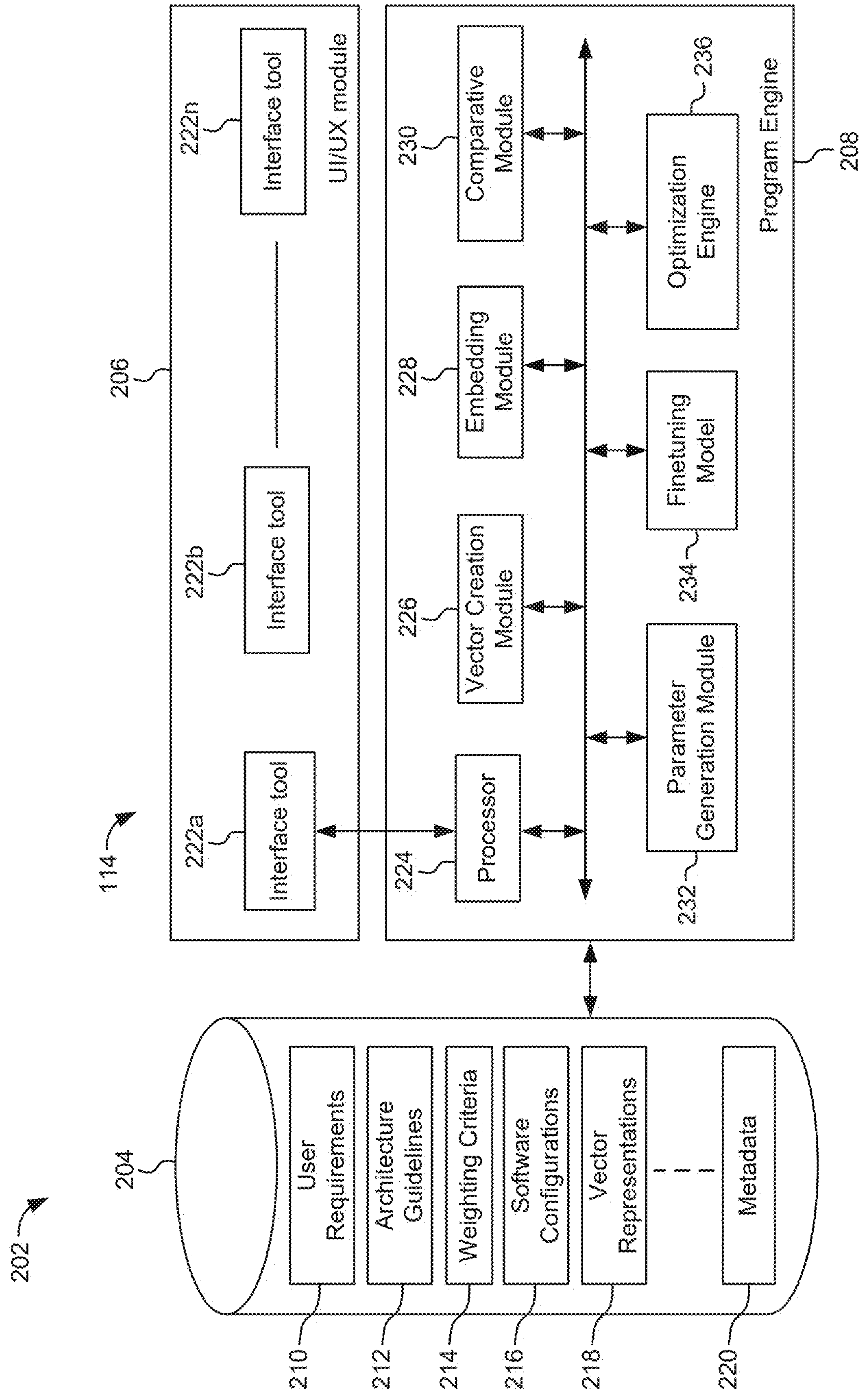
FIG. 2 depicts an example architecture of a system in accordance with implementations of the present disclosure.

FIG. 2 depicts an example architecture 202 of the system 114 in accordance with implementations of the present disclosure. In an example, as depicted in FIG. 2, the system 114 receives one or more queries and generates content/responses such as, but are not limited to, text, images, audio, video, and/or the like, for the queries. The queries may include prompts for building a program, for example, information pertaining to how the program should function, look, or act like. The responses may include questions for additional information, architecture of the program, components of the program, preview of the program, request for feedback/inputs, and/or the like required for building the program.

The system 114 includes knowledge base 204, a User Interface (UI)/User Experience (UX) module 206, and a program engine 208. The knowledge base 204 may be described as a structured repository or database associated with the system 114. The knowledge base 204 may incorporate various knowledge representation schemes, such as ontologies, taxonomies, or semantic networks, to encode and organize information in a machine-understandable format, thereby enabling advanced search, inference, and reasoning capabilities. Furthermore, the knowledge base 204 may leverage advanced technologies, including natural language processing, machine learning, and knowledge engineering techniques, to enhance knowledge acquisition, update, and refinement processes, ensuring its continual relevance and adaptability to evolving needs and circumstances.

In some implementations, the knowledge base 204 includes user requirements 210, architecture guidelines 212, weighing criteria 214, software configurations 216, vector representations 218, metadata 220, and additional information (not shown) pertaining to the system 114. The user requirements 210 refer to information (here, information can refer to a first information or a second information) received from the user via a query, the information having functional and technical requirements for the program. The information/user requirements 210 are shared by a user associated with the system. Notably, the user interacts with the system to share the user requirements via the UI/UX module 206. Architecture guidelines 212 refer to rules or guidelines pertaining to specificities of program or software architecture. Such guidelines may govern utilization of different architectures based on varied requirements and implementations.

Weighing criteria 214 refers to rules or criteria for determining weights for architecture or software components/solutions which may be implemented within the program for addressing the functional and technical requirements. Based on the weighing criteria, and hence weights assigned to various solution options, the system 114 selects a best solution for each requirement. The software configurations 216 refer to solutions and configurations for the software programs. These configurations may be utilized to run the program, since many solutions may be implemented according to the software configurations 216.

The vector representations 218 refer to the numerical encoding of objects such as words or documents into vectors within a multidimensional space. These vectors are structured to capture semantic similarities and relationships between the objects they represent, facilitating efficient computational analysis and comparison tasks across various domains. Techniques such as word embeddings or document embeddings are commonly employed to generate these representations, enabling advanced applications in fields such as natural language processing, machine learning, and data mining. The metadata 220 may be described as descriptive information pertaining to the data including, user requirements 210, architecture guidelines 212, weighing criteria 214, software configurations 216, and vector representations 218, stored within the knowledge base 204.

The UI/UX module 206 may be defined as a module, which designs and manages a User Interface (UI), via which the user interacts with the system 114, and the User's Experience (UX) during said interaction. The UI/UX module 206 may integrate various technologies and frameworks to optimize visual layout, interactive elements, and overall usability, often utilizing principles of Human-Computer Interaction (HCI) and graphic design.

In some examples, the UI/UX module 206 may represent one or more front-end components/interfaces **222*a*-222*n* of a chatbot that may be executed on one or more of the computing devices 102 and 104** to enable receipt of the queries and responding to the same. In some examples, the query may be received through various modalities including, but not limited to, a question input to a chat bot, a request provided through a Graphical User Interface (GUI), an email, and/or the like.

The program engine 208 may be configured for processing the user information received through the UI/UX module 206 using one or more Generative Artificial Intelligence (Gen AI) models, like large deep learning neural network. The large deep learning neural network may be trained using broad range of generalized, unlabeled training data and that may perform a multitude of general tasks. Examples of the tasks may include generating text, generating images, conversing in natural language, generating video, generating audio, and/or the like. In some examples, the applications may be built on top of the Gen AI models. In some examples, multiple Gen AI models may be used to perform a range of functionality for an application.

The Gen AI models may include, for example, Large Language Models (LLMs), that may be used to generate text for a variety of use cases. In some examples, the LLMs may be integrated in digital assistants (for example: chatbots), replacing traditional rule-based systems to provide textual responses to a user input. An LLM may be described as an advanced type of language model that is trained using deep learning techniques on massive amounts of text data. The text data is general and not specific to any particular domain.

An LLM may be described as an advanced language model that is trained using deep learning techniques on massive amounts of text data. The text data is general and not specific to any particular domain. The LLMs may generate human-like text and perform various Natural Language Processing (NLP) tasks (for example, translation, question-answering, and/or the like). In some examples, the LLM refers to models that use deep learning techniques and have a plurality of parameters, which may range from millions to billions. The LLMs may capture complex patterns in language and produce text that is often indistinguishable from that written by humans. The produced text may be processed through a deep learning architecture such as, recurrent neural network (RNN), a transformer model, and/or the like.

While implementations of the present disclosure are described in further detail with non-limiting reference to the LLMs as the example Gen AI models, it is contemplated that implementations of the present disclosure may be realized using any appropriate foundation models or Machine Learning (ML) models, or Artificial Intelligence (AI) models. Such models may generate the content/response based on any appropriate modality (for example, text, audio, image, video, and/or the like). In some examples, the response may correspond to the one or more task being represented by the conversational queries.

In some examples, the Gen AI models may be provided by one or more third parties. In some examples, the Gen AI models may be provided by the system 114. The Gen AI model receives information/user queries pertaining to the requirements for the program, and provide the program, components of the same, and responses to the queries. For example, questions/information requests may be received as queries through an Application Programming Interface (API).

The program engine 208 includes one or more processors 224, a vector creation module 226, an embedding module 228, a comparative module 230, a parameter generation module 232, a finetuning module 234, and an optimization engine 236.

The processor 224 may include, for example, microprocessors, microcomputers, microcontrollers, digital signal processors, central processing units, state machines, logic circuits, and/or any devices that manipulate data or signals based on operational instructions. Among other capabilities, the processor 224 may fetch and execute computer-readable instructions in a memory operationally coupled with the system 114 for building and running the program.

The vector creation module 226 creates vector representations 218 of the information received from the user, for example, the functional and non-functional requirements. Additionally, the vector creation module 226 may also create vector representations 218 for at least one solution for each requirement, generic software protocols, software configurations 216, and the like. Notably, the vector creation module 226 transforms the information (also be referred to as high-dimensional input data), such as words or tokens from text corpora, into lower-dimensional vector representations 218.

The embedding module 228 embeds the vector representations 218 in an embedding space. These embeddings encode semantic information about the information/data, facilitating the capture of relationships and similarities between words or tokens. The embedding module 226 employs various techniques, including Word Embeddings (such as Word2Vec, GloVe) and contextual embeddings (like ELMo, BERT) for generating dense numerical representations of words based on their contextual usage. These embeddings serve as compact and informative representations suitable for downstream machine learning tasks, such as text classification, sentiment analysis, and language modeling.

In some instances, the embedding module 226 may be implemented with respect to Retrieval-Augmented Generation (RAG). Within the RAG framework, the embedding module 226 is utilized in both the retrieval and generation processes. The embedding module 226 may advantageously enable efficient selection of software components by representing the information having functional and technical user requirements, as well as respective solutions for each requirement, while also guiding the generation of coherent responses by encoding contextual information. In other instances, the embedding module 226 may be implemented with respect to a Knowledge Graph (KG). Within the KG framework, the embedding module 226 serves a dual role in both querying and generating information.

The comparative module 230 compares all identified solutions amongst each other to ensure that any combination of implementation of these solutions does not create conflict in the program. In such, the comparative module 230 marks the solutions which are creating conflicts, and generates the combination of solutions for the program such that two conflicting solutions are not iterated in the same combination. For example, for two requirements req1 and req2, there may be two identified solutions for each. Solution1a and solution1b for req1, and solution2a and solution 2b for req2. Then, if the solution 1a and the solution 2b conflicting, the combination of solutions are: solution1a, 2a; and solutions 1b, 2b.

Once all user requirements (including functional and technical requirements) and respective solutions are embedded into the embedding space, the parameter module 232 assigns weights to each of the embeddings based on the weighing criteria 214. These weights are assigned based on one or more parameters, such that each solution is assessed based on each parameter. For example, if a first parameter is scalability, and a second parameter is sustainability, two solutions may be assigned different weights based on each of the parameters.

The weights may be assigned as: solution 1 may have weight 0.56 for scalability but 0.82 for sustainability, and solution 2 may have weight 0.71 for scalability but 0.68 for sustainability. Here, if the user requirements indicate that the user is more interested in sustainability, then weights assigned to solution 1 may be 0.77 and solution 2 may be 0.70, such that solution 1 gets selected.

The finetuning module 234 fine-tunes selection of the solutions based on the embeddings to select an optimum selection of solutions for building the program. Typically, the fine-tuning model 234 is utilized when modifying an existing program. In such cases, log data and other information (for example, architecture specifications, program components, and the like) are also embedded into the embedding space using the embedding module 228.

The optimization engine 236 utilizes a continuous loop capturing and assessing user feedback, metrics, and additional data (for example, performance metrics, carbon emissions, and the like) to iteratively improve the program. In this way, the optimization engine 236 optimizes functions of the system 114 by improving anomaly detection capabilities, remediation effectiveness, documentation quality, and the like, leading to improved accuracy and efficiency for building the program. In some cases, the optimization engine 236 may utilize sentiment analysis to record usage and preferences.

Figure 3:
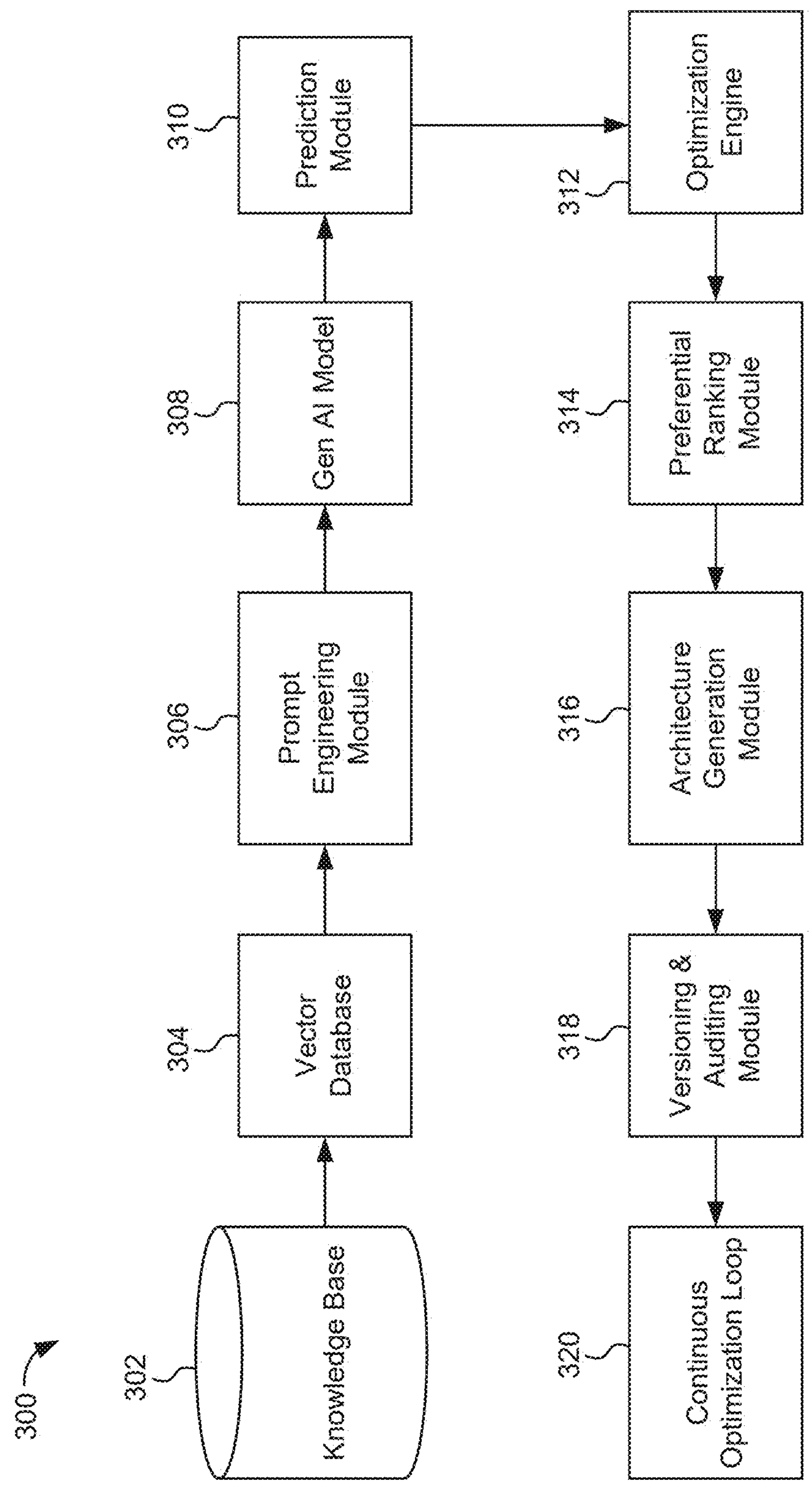
FIG. 3 depicts a block diagram showing a process flow of building a program during a design phase in accordance with implementations of the present disclosure.

FIG. 3 depicts a block diagram 300 showing a process flow of building a program during a design phase in accordance with implementations of the present disclosure.

As shown in FIG. 3, functional specifications, technical requirements, program profile, program specifications, and additional relevant information from the knowledge base 204/302 are provided to a vector database 304. The vector database 304 creates and stores vectorized representations of the information (including functional specifications, technical requirements, program profile, program specifications, and additional relevant information from the knowledge base 204/302). Additionally, the information along with their vectorized representations are provided to a prompt engineering module 306.

The prompt engineering module 306 generates efficient and accurate prompts for the Gen AI model 308. For example, if the first requirement comprises "small e-commerce application with secure web hosting, fast checkout process, transparent brand information pages, users<500, concurrent users: 30, RTO: 1 hour, RPO: 4 hours", the prompt generated by the prompt engineering module 306 may be "Front End could be Angular or MVC, Load Balancer could be Azure Load Balancer, Database could be Azure SQL". Such intelligent prompts may provide additional context to the Gen AI model 308 for building the program.

The Gen AI model 308 generates novel parameter configurations that maximize desired objectives while satisfying operational constraints. In this way, the Gen AI model 308 provides multiple solution combinations for satisfying the technical and functional requirements. The Gen AI model 308 learns patterns, correlations, and relationships between technical parameters and outcomes, resulting in recommendations for the solution combinations. The Gen AI model 308 utilizes a plurality of techniques for identifying the combinations of solutions. These techniques enable the Gen AI model 308 to explore complex, high-dimensional parameter spaces and discover solutions for parameter combinations that may not be apparent through traditional approaches. Thereafter, the Gen AI model 308 provides the solution combinations along with the technical requirements to a prediction module 310.

The prediction module 310 predicts key performance indicator (KPI) requirements for each of the combinations of solutions. The KPI attainments may include, performance, cost involvement, time involvement, and the like. The prediction module 310 may utilize an autoregressive time series model to calculate weightages of attributes for each KPI attainment for the combination of solutions. Further, the prediction module 310 generates weightage outputs for each of the combination of solutions. The prediction module 310 shares the KPI attainments for each of the combination of solutions along with the combinations of solutions with the optimization engine 236/312.

The optimization engine 312 identifies optimal solutions from the combinations of solutions. In such, the optimization engine 312 employs optimization algorithms such as Bayesian optimization, or reinforcement learning to search for optimal parameter configurations. These algorithms iteratively explore the parameter space, evaluate the combinations of solutions based on their predicted performance, and adaptively refine to converge towards optimal solutions.

Further, the optimization engine 312 provides the combinations of solutions to a preferential ranking module 314. The preferential ranking module 314 uses a preferential ranking algorithm to rank the combinations of solutions based on enriched attributes based on occurrences and weights to provides top recommendations for the combinations of solutions. The Preferential Ranking Algorithm interprets preferences and suggests top relevant combination of solutions. The preferential ranking module 314 provides preferred combinations of solutions to an architecture generation module 316.

The architecture generation module 316 automatically generates an architecture diagram for the program, based on the preferred combinations of solutions, the technical requirements, and the functional requirements. The architecture generation module 316 utilizes natural language generation (NLG) to convert non-linguistic representations (such as data, information, or concepts) into coherent and fluent human language expressions. The architecture diagram is a visual representation that illustrates the structure, components, relationships, and interactions of a program.

In operation, the architecture diagram details the essential elements of the program and their connections, guiding in designing and implementing the program effectively. These diagrams clarify the program's layout, dependencies, data flow, and operational processes, which are crucial for ensuring that the program meets its functional requirements and performance goals. When architecture diagrams are accurate and comprehensive, they contribute to the development of programs that are cost-effective, efficient, and accurate, minimizing errors and optimizing development efforts.

Thereafter, the program may be built and run (deployed) via a server for use. After deployment, the system 114 continues to track and govern appropriate functioning of the program, and implementing changes whenever required. Notably, the system 114 keeps tracking and governing appropriate functioning of the program by continuously checking log data, storage, and/or processing units associated with the program, along with performance of the program to identify anomalies. A versioning and auditing module 318 having access to the program and associated log data, maintains versioned document repositories to ensure data integrity and compliance with regulatory requirements. Advantageously, maintaining the versioned documents enables traceability and auditability of changes over time, with robust access controls and permissions management.

Further, the optimization engine 312 is employed to run a continuous improvement and feedback loop 320. The continuous improvement and feedback loop 320 is utilized to capture user feedback, metrics, and insightful data metrics, for example, performance metrics, carbon emissions, and the like, to iteratively improve the system's 114 architecture suggestion capabilities. The optimization engine 312 utilizes sentiment analysis to record usage and preferences. When the data reflects any anomalies (for example, slow, lagging, broken links, and the like), the optimization engine 312 analyses which component of the program is causing the anomaly and updates the architecture of the program, and thereby, the program, to ensure efficient functioning.

Figure 4:
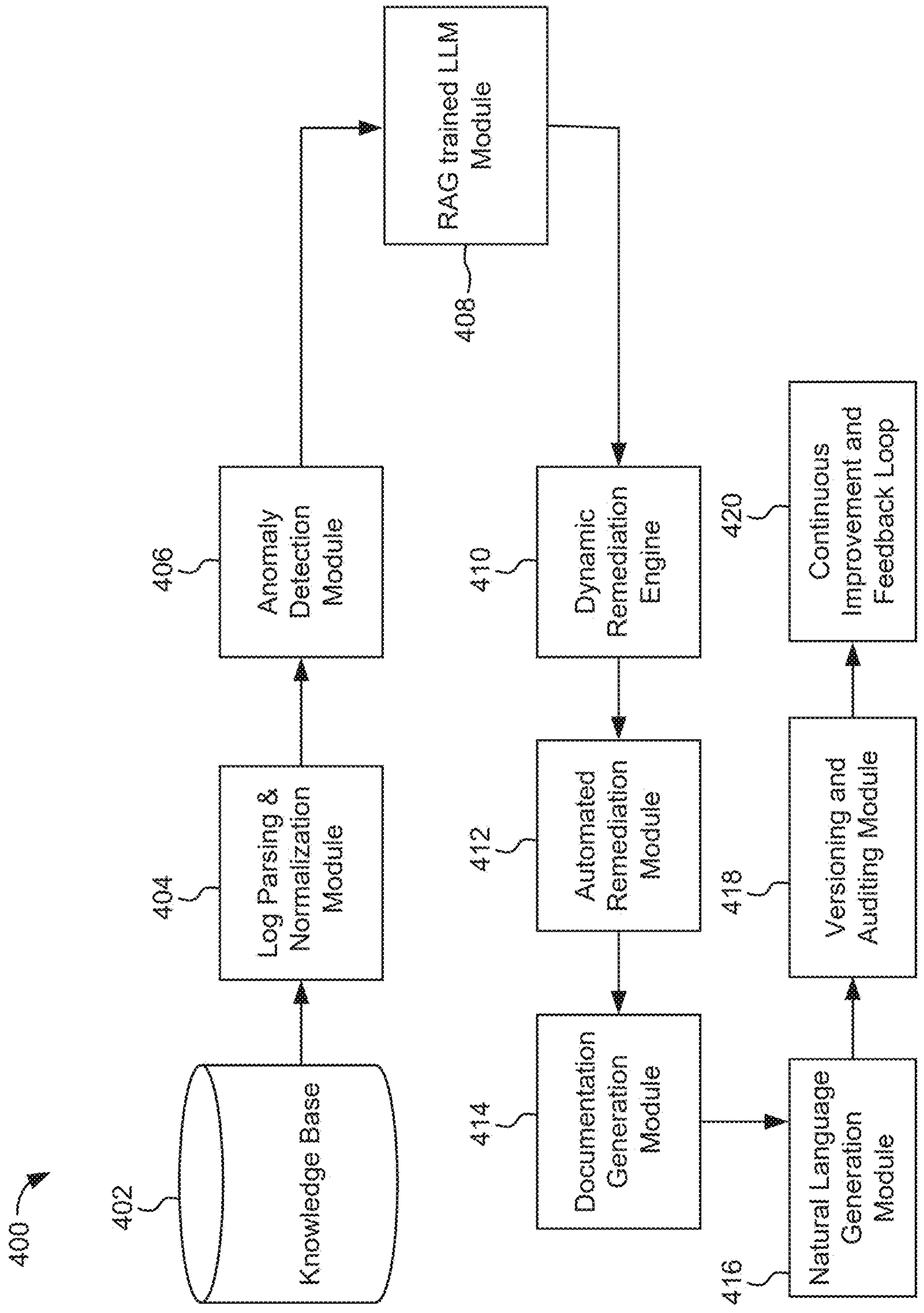
FIG. 4 depicts a block diagram showing a process flow of building a program during a run phase in accordance with implementations of the present disclosure.

FIG. 4 depicts a block diagram 400 showing a process flow of building a program during a run phase in accordance with implementations of the present disclosure.

The system 114 collects log data from diverse sources, including servers, applications, network devices, and cloud services, leveraging standard protocols and APIs for seamless integration. Log data refers to recorded events from the program which provides insights for diagnosing issues and improving operational efficiency.

As shown in FIG. 4, functional specifications, technical requirements, program profile, program specifications, log data, and additional relevant information from the knowledge base 204/302/402 are provided to a log parsing and normalization module 404. The log parsing and normalization module 404 processes raw log data related to the program, extracting essential details like timestamps and event IDs from unstructured formats. Thereafter, the log parsing and normalization module 404 standardizes this information into a consistent format, enabling efficient analysis and troubleshooting. Advantageously, log parsing and normalization assists in identifying and resolving issues to ensure smooth operation of the program. The log parsing and normalization module 404 provides the standardized information to an anomaly detection module 406.

The anomaly detection module 406 analyzes the normalized log data to detect anomalies, or deviations from normal behavior. In such, the anomaly detection module 406 leverages techniques such as statistical analysis, machine learning models, and anomaly detection algorithms to detect the anomalies. The detected anomalies are then provided to a RAG trained LLM module 408. RAG (Retrieval-Augmented Generation) is a technique in natural language processing where the generation of text is enhanced by retrieving relevant information from a large dataset or knowledge base.

This advantageously improves the quality and relevance of generated outputs by leveraging external sources during the generation process. The RAG-trained LLM 408 (Retrieval-Augmented Generation trained Language Model) refers to a language model that has been specifically trained using the RAG framework. This model integrates retrieval-based techniques with generative capabilities, allowing it to enhance its output by accessing and incorporating information from external sources during text generation tasks for communicating with the user.

Based on anomalies detected, the LLM Module 408 generates appropriate architecture styles and parameter combinations to satisfy the functional and technical requirements. Often, programs may experience issues due to rigid architecture and code. In order to ensure smooth functioning of the program, the LLM Module 408 mitigates risk of wrong architecture patterns to satisfy the KPIs (key performance indicators) from a vast datasets of historical parameter configurations, experimental results, and performance metrics. If any issues are identified, the LLM module 408 suggests remediation strategies to fix the issues.

The LLM module 408 employs optimization algorithms such as Bayesian optimization, or reinforcement learning to search for optimal parameter configurations. These algorithms iteratively explore the parameters, evaluate candidate configurations based on their predicted performance, and adaptively refine to converge towards optimal solutions. The detected anomalies and solutions from the LLM module 408 are then provided to a dynamic remediation engine 410.

The dynamic remediation engine 410 assesses severity and impact of identified anomalies, prioritizes remediation actions according to predefined policies and rules, and dynamically adjusts strategies to align with the KPIs for technical requirements and business priorities. In such, the dynamic remediation engine 410 generates remediation modules/scripts based on the remediations that need to be performed as well as recommended remediation strategies. This advantageously ensures that remediation efforts are optimized and responsive to current operational needs and risk profiles. The remediation strategies, along with the functional and technical requirements and KPIs are provided to an automated remediation module 412. The automated remediation module 412 automatically executes remediation actions through orchestration tools, automation scripts, or integration with third-party platforms. This ensures swift responses and reduces manual intervention, leveraging an Extended LLM model with fine-tuning capabilities to enhance effectiveness.

Thereafter, a document generation module 414 automatically generates detailed documentation, and post-incident reviews, for each detected anomaly and remediation action, using Generative AI techniques. The document generation module 414 integrates with data sources and templates to compile information into structured reports, ensuring efficiency and consistency in producing documents such as incident reviews. The post-incident reviews include incident reports, root cause analysis findings, remediation procedures to populate predefined templates with relevant information. Further, the document generation module 414 generates the architecture diagram, design document, requirements document along with functional and technical requirements automatically, and provides the same to a natural language generation module 416.

The natural language generation module 416 leverages natural language generation techniques to synthesize human-readable documentation in various formats, such as text documents, PDF reports, or interactive dashboards, ensuring accessibility and comprehensibility for stakeholders (for example, the user). The natural language generation module 416 provides all data pertaining to the program to a versioning and auditing module 418. The versioning and auditing module 418 maintains versioned documentation repositories, enabling traceability and auditability of changes over time, with robust access controls and permissions management to ensure data integrity and compliance with regulatory requirements.

Furthermore, the optimization engine 312 (not depicted in this figure) is employed to run a continuous improvement and feedback loop 320/420. The continuous improvement and feedback loop 420 is utilized to capture user feedback, metrics, and insightful data metrics, for example, performance metrics, carbon emissions, and the like, to iteratively improve the system's 114 anomaly detection capabilities, remediation effectiveness, and documentation quality, driving ongoing innovation and enhancements. The optimization engine 312 utilizes sentiment analysis to record usage and preferences.

Figure 5:
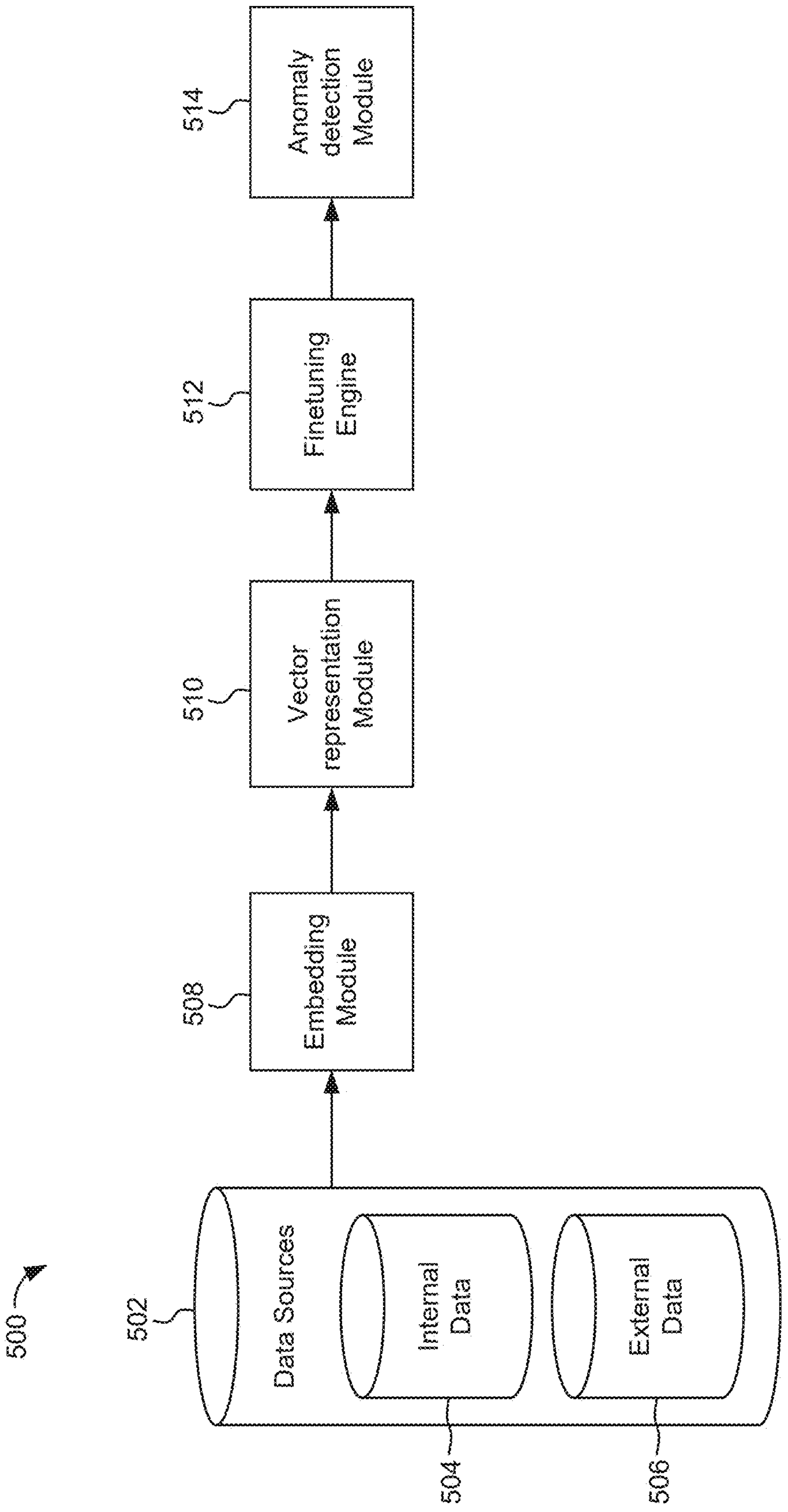
FIG. 5 depicts a block diagram showing a process flow of fine-tuning a new program in accordance with implementations of the present disclosure.

FIG. 5 depicts a block diagram 500 showing a process flow of fine-tuning a new program in accordance with implementations of the present disclosure.

As shown in FIG. 5, internal data 504 and external data 506 stored at a data source 502 is provided to the embedding module 228/508. The data source 502 refers to an internal data repository associated with the system 114. The internal data 504 refers to internal program related information, including user profiles, project profiles, organization/enterprise profiles, reference architecture documents or patterns, reference architecture diagrams, and the like. The external data 506 refers to generic data for building programs, including reference architecture documents or patterns, industry benchmarks or KPIs for architecture, performance, scalability, operational efficiency, security, maintainability, usability, and the like.

The embedding module 508 transforms the internal data 504 and the external data 506 into vector representations and shares the vector embeddings to a vector representation module 510. The vector representation module 510 then embeds the vector representations of the data (including internal data 504 and external data 506) into the embedding space. The vector representation module 510 comprises the embedding space, which may be implemented as the RAG, a search engine, and a semantic ranker. The vector representation module 510 utilizes the search engine and the semantic ranker to search for solutions pertaining to each requirement, by leveraging graph searching techniques. The graph searching techniques include hybrid nearest neighbor search, semantic search, semantic ranking, and the like. Further, the vector representation module 510 utilizes the semantic ranker to rank each of the solutions (pertaining to each requirement), and shares the same to a finetuning engine 510.

The finetuning engine 512 refers to an engine utilized for fine-tuning the solutions and identifying an appropriate combination of solutions which functions in harmony (that is, without creating conflicts). For this, the finetuning engine 512 employs an LLM, one or more prediction algorithms, and the preferential ranking module 314, such that the LLM identifies possible combinations of solutions, the prediction algorithms identify the combinations of solutions that would not create conflict, and the preferential ranking module ranks preferred combinations of solutions by ranking the same based on weights. The weights are assigned to each solution within the RAG, based on parameters of the technical requirements (for example, scalability, interoperability, speed, and the like). The weights for the combinations of solutions are calculated based on weights assigned to each solution of each combination.

Thereafter, the anomaly detection module 406/514 analyzes log data pertaining to the program to detect anomalies, or deviations from normal behavior. If any anomalies are detected, they are instantly resolved by the RAG trained LLM module 408 (not shown in this figure). This advantageously ensures smooth functioning of the program, eventually leading to cost and time savings.

Figure 6:
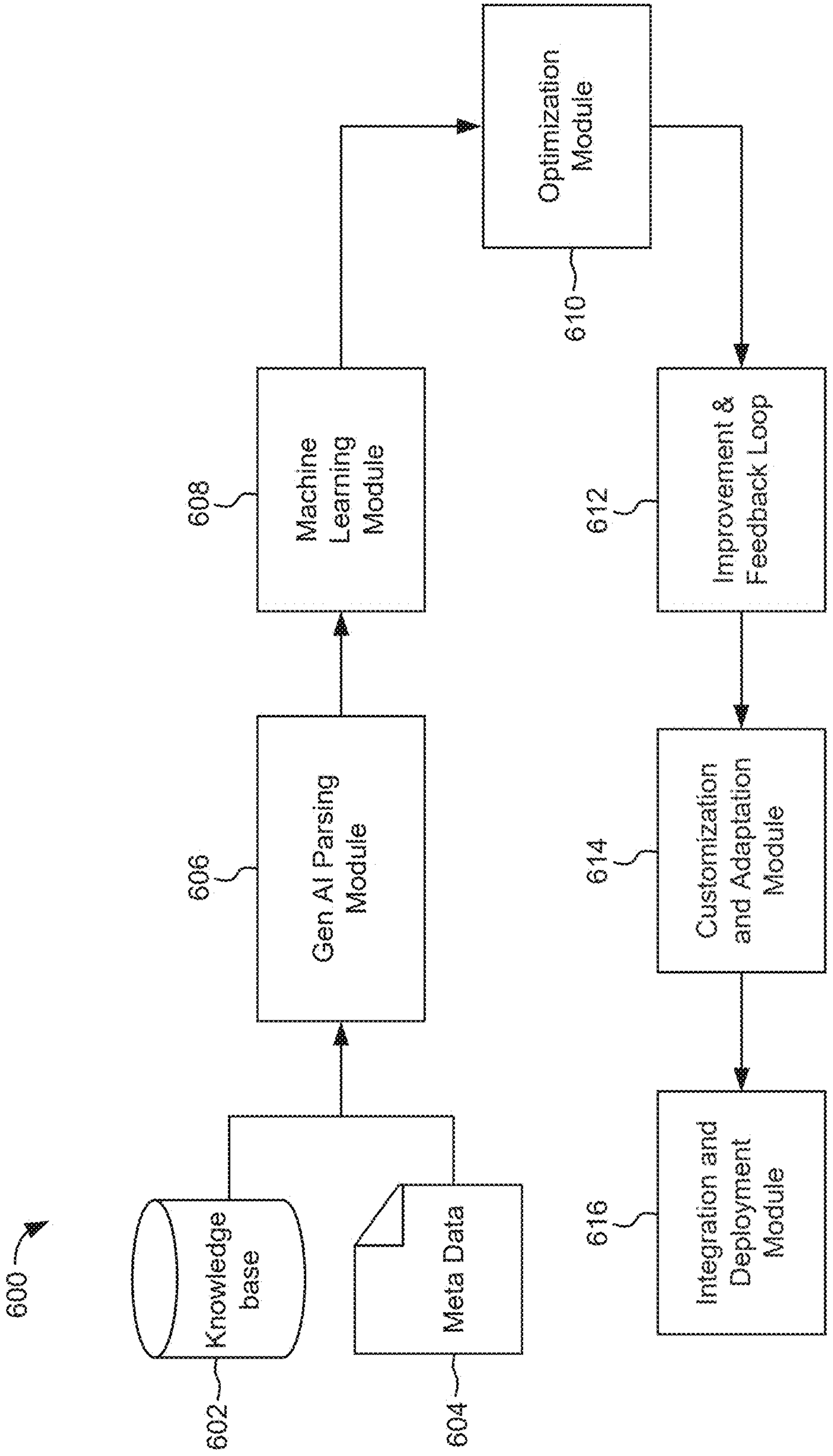
FIG. 6 depicts a block diagram showing a process flow of generating parameters for a new program in accordance with implementations of the present disclosure.

FIG. 6 depicts a block diagram 600 showing a process flow of generating parameters for a new program in accordance with implementations of the present disclosure.

As shown in FIG. 6, functional specifications, technical requirements, program profile, program specifications, and additional relevant information from the knowledge base 204/302/402/602, and metadata 220/604 are provided to a Gen AI parsing module 606. In an example, the functional specification may be "I need a front end for a retail application," and the metadata 604 may be user profile, project profile, organization/enterprise profile, functional specifications, non-functional requirements, industry benchmarks, and the like.

The Gen AI parsing module 606 refers to a module which generates parameter configurations based on the technical (that is, non-functional) requirements. It will be appreciated that the technical requirements include technical parameters requisite for building the program. The Gen AI parsing module 606 incorporates generative AI techniques to generate novel parameter configurations which maximize desired objectives while satisfying constraints after parsing the inputs. These techniques enable the Gen AI parsing module 606 to explore complex, high-dimensional parameter spaces and discover innovative solutions for parameter combinations that may not be apparent through traditional approaches. The Gen AI parsing module 606 shares the parsed and original data with a machine learning module 608.

The machine learning module 608 refers to a module which provides recommendations for parameter settings. The machine learning module 608 utilizes machine learning models trained on vast datasets of historical parameter configurations, experimental results, and performance metrics. These models learn patterns, correlations, and relationships between input parameters and outcomes, enabling them to generate intelligent recommendations for parameter settings. The machine learning module 608 provides the recommended parameter configurations to an optimization module 610.

The optimization module 610 identifies optimal parameter configurations based on the recommended parameter settings. The optimization module 610 employs optimization algorithms such as Bayesian optimization, or reinforcement learning to search for optimal parameter configurations. These algorithms iteratively explore the parameter space, evaluate candidate configurations based on their predicted performance, and adaptively refine the search process to converge towards optimal solutions. The optimizer module 610 provides the optimal parameter configurations along with additional relevant data to an improvement and feedback loop 612. The improvement and feedback loop 612 enables continuous iterative improvement and adaptation for a variety of changing requirements, ensuring that generated parameters remain relevant and effective over time. The improvement and feedback loop 612 provides the generated parameters and the additional relevant data to a customization and adaptation module 614.

The customization and adaptation module 614 is configured to customize the generated parameters based on user inputs. In such, the customization and adaptation module 614 provides customization options to the user for tailoring parameter generation strategies to specific applications, domains, or user preferences. In this way, the user(s) can specify preferences, constraints, and trade-offs to guide the parameter generation process and prioritize certain objectives or criteria over others. The customization and adaptation module 614 provides the customized parameters, functional and technical requirements, metadata 604, and additional enterprise data from the knowledge base 602 to an integration and deployment module 616.

The integration and deployment module 616 provides APIs, libraries, or interfaces for seamless integration with existing software platforms, frameworks, or workflows. In this way the user(s) may incorporate the parameter generation engine into their applications, research projects, or automation pipelines to streamline parameter tuning, optimization, and experimentation processes.

Figure 7:
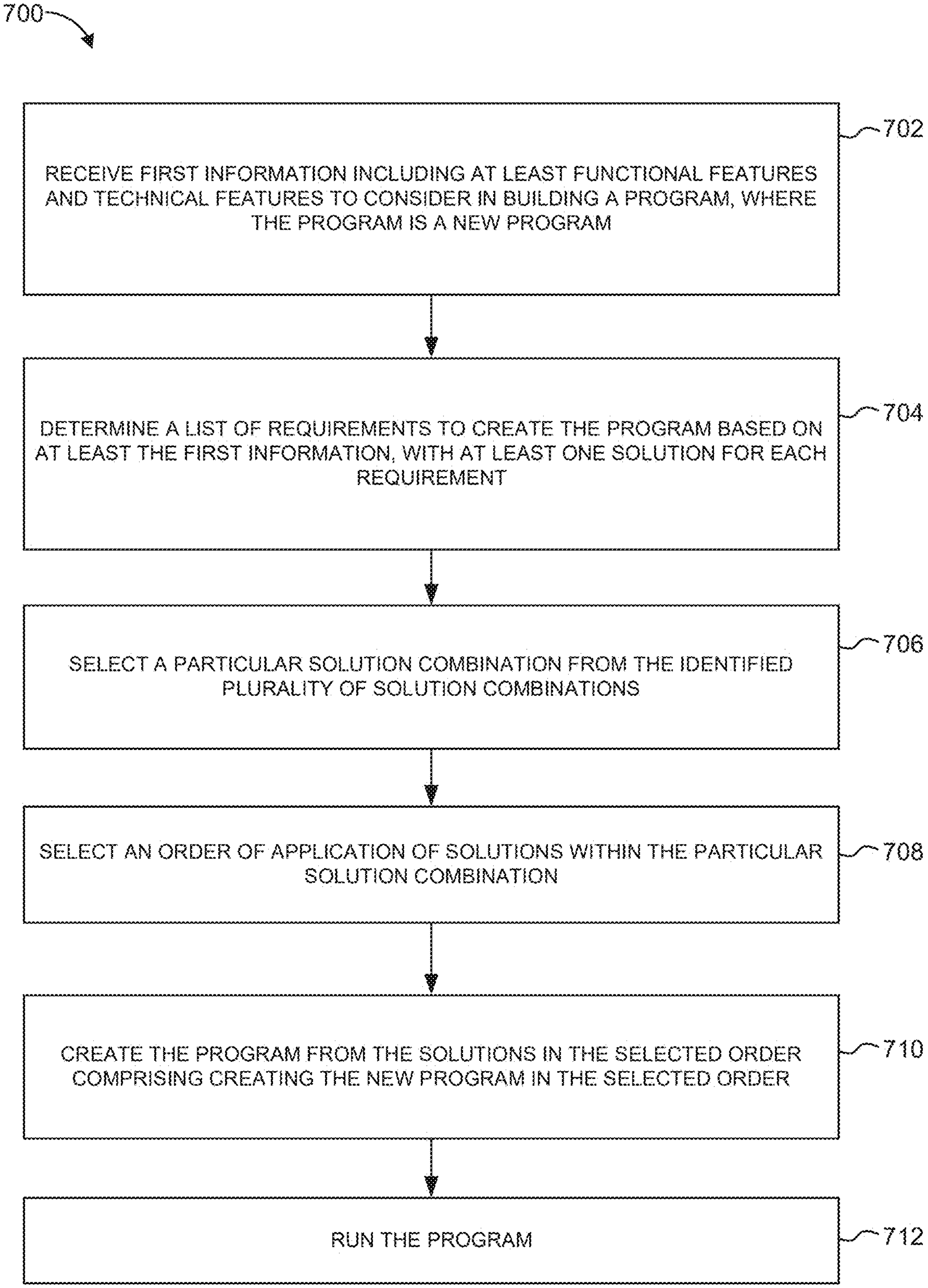
FIG. 7 is a flow diagram presenting an exemplary method in accordance with implementations of the present disclosure.

FIG. 7 is a flow diagram presenting an exemplary method 700 in accordance with implementations of the present disclosure. The exemplary method 700 pertains to a design instance implementation of the present disclosure, for building and running a new program.

It will be appreciated that the method 700 is performed by the Gen AI model. This means that the Gen AI model is executing the method 700, which includes processing data, running computations, and applying algorithms as specified. The Gen AI model utilizes its trained capabilities to conduct each step of the method, ensuring that the operations are conducted efficiently and in accordance with the predefined parameters. The model's involvement ensures that the method 700 benefits from advanced data handling and decision-making processes provided by the Gen AI technology.

At step 702, first information including at least functional features and technical features to consider in building a program is received. The first information is received from a user associated with the system 114. The user may be at least one of: a stakeholder, a developer, a salesperson looking to provide solutions to a client, a manager, and the like. Additionally, the user may provide the first information to the system 114 via the UI/UX module 206.

The functional features/requirements refer to specific functions that the program is to provide. Examples of functional requirements include filtering capability, user choice capabilities for each category, product characteristics inclusion, add to cart functionality, personalized recommendation capability, cart verification capability, account creation and sign in capability, user account facilities for resetting passwords and change account details, user feedback capability, order status tracking capability, and the like.

The technical features/requirements (also referred as non-functional features/requirements) refer to operating parameters of the program. Examples of the technical features or requirements include scalability, maintainability, performance, portability, security, reliability, usability, sustainability, and the like. Specific functionalities are required for each of the technical features.

For example, for a technical requirement of 'useability,' such functionalities may include browser accessible capability, easy to use, easy navigation capability, simple user-friendly feature capability, and the like. Similarly, for 'performance,' such functionalities may include quick checkout capability, for 'security,' the functionalities may include account creation, password generation, account locking, and similar capabilities.

For 'portability', the functionalities may include leveraging cloud containers, effective functioning on multiple devices, and the like; for 'compatibility', the functionalities may include operability across different hardware and operating systems; for 'reliability', the functionalities may include low amount of critical failures, quick recovery capability; for 'availability', the functionalities may include availability, low failure based on traffic, and the like; for 'maintainability', the functionalities may include low mean time for restoration following failure; and for 'observability', the functionalities may include logging capabilities.

In this instance, the program is implemented as a new program. The program refers to a set of instructions, routines, or algorithms expressed in a programming language, designed to be executed by a computer or other electronic device to perform specific tasks or functions. The program may be implemented to provide functionalities to the enterprise/organization associated with the system 114. For example, the program may be implemented for an IT incident resolution platform.

At step 704, a list of requirements is determined to create the program based on at least the first information. The list of requirements refers to required aspects necessary for building the program. In operation, the program is built to comply with each of the list of requirements. The list of requirements is harvested from the first information having technical and functional features. For example, from the functional features, a list of functional requirements detailing specific tasks and interactions the program is expected to perform may be extracted. Similarly, non-functional, or technical requirements, architecture requirements, regulatory and compliance requirements, testing and validation requirements, legal requirements and documentation/versioning requirements may be extracted from the first information.

The determination to create the program comprises, with at least one solution for each requirement, a first identification of a plurality of solution combinations from the at least one solution for each requirement. In operation, each requirement may be mapped with one or more solutions, which may be pruned in further steps. For example, multiple solutions may be implemented for a requirement of 'scalability.' In this way, all solutions, for example, solution 1 (MVC, Web API, Azure Service Bus, Microservices, Azure SQL DB, Front Door), solution 2 (Angular, Graph QL, Rabbit MQ, Cosmos DM, Dapper), solution 3 (ASP.NET web App, Azure Service Bus, Cosmos DB, Log 4NET), and solution 4 (MVC, Web API, Rabbit MQ, Dapper, Microservices, Azure SQL DB, Front Door, Azure AppInsights) may be considered for satisfying the requirement for scalability.

Additionally, in some cases, each requirement may require a plurality of solution components to be implemented to accurately satisfy the requirement. In such cases, the at least one solution may be split into multiple components, and the first identification may include identifying at least one component for each component of the at least one solution for satisfying the requirements.

The first identification refers to identifying the plurality of solution combinations from the at least one solution. This involves analyzing the at least one solution to determine all possible combinations or permutations that can be derived from it. For example, if the solution consists of various design elements, identifying involves enumerating all feasible arrangements and interactions of these elements. By identifying these combinations, the system 114 assesses their potential effectiveness, efficiency, and compliance with specified requirements or constraints. Advantageously, the first identification provides a foundational basis for further analysis and decision-making in the program development process.

The first identification comprises a second identification of solution combinations that meet each of the requirements where solutions within the solution combinations do not conflict. This involves evaluating the combinations identified during the first identification to ensure that each one meets all specified requirements and that no individual solutions within the combinations create conflicts or incompatibilities.

For example, when assessing a set of design options, this step ensures that each combination adheres to the technical requirements and that no elements within a combination interfere with each other. By performing the second identification, the system 114 confirms feasibility and compatibility of each combination, thereby ensuring that all selected solutions work together effectively and meet the required criteria. This advantageously provides critical validation for further stages of analysis and decision-making in the program development process.

Further, the determination to create the program comprises, in the absence of identified solution combinations where the solutions within any of the solution combination do not conflict, a third identification of solution combinations based on weighting assigned to the requirements, such that the solution combinations include solutions from higher weighted requirements and exclude conflicting solutions from lower weighted requirements.

Weights are numerical values assigned to each requirement and solution in the Retrieval-Augmented Graph (RAG) to quantify their relative importance or priority. Specifically, the third identification involves assessing the weights assigned to each requirement, where higher weights may signify greater importance. Based on the same, the system 114 selects solution combinations that include solutions satisfying requirements with higher weights. Conversely, the system 114 excludes solutions that conflict with requirements assigned lower weights.

For example, if a requirement for the new program is sustainability, and solution A addresses this requirement with a weight of 5 while solution B addresses a different aspect with a weight of 2, the system 114 prioritizes solution combinations that include Solution A. This ensures that the solutions most aligned with the higher-weighted requirement of sustainability are selected. Consequently, Solution A, with its higher weight, will be favored over Solution B, leading to an optimized focus on sustainability in the new program development. This advantageously ensures that the selected solutions align with essential requirements and optimizes an overall effectiveness of the program.

At step 706, a particular solution combination is selected from the identified plurality of solution combinations. This selection includes evaluating available solution combinations based on the functional and technical requirements. Examples of the requirements may include compatibility, effectiveness, and alignment with the program's objectives. One or more evaluation criteria may be applied to assess how well each solution combination meets the requirements, considering program parameters such as performance metrics, cost considerations, and any constraints imposed by the program's goals. The particular solution combination is chosen based on its ability to fulfill maximum priority requirements and optimizing overall program effectiveness. This advantageously ensures that the particular solution combination represents appropriate choices from amongst the identified options, thereby contributing to successful implementation and functionality of the program.

At step 708, an order of application of solutions within the particular solution combination is selected. This involves determining a sequence in which the solutions are applied, based on factors such as their interdependencies and the program's objectives. The chosen order ensures that each solution is implemented effectively, considering the required input and output relationships. Appropriate selection of the order advantageously optimizes the overall impact and efficiency of the program, and reduces computational time. Additionally, it may often be advantageous to build the program in a given order, since it may satisfy some technical requirements, for example, sustainability, leading to reduced computational time and eventually reduced computational costs.

At step 710, the program is created from the solutions in the selected order. This involves integrating the solutions into the program according to the previously determined sequence. The creation process incorporates each solution sequentially, ensuring that each solution is applied in the selected order to achieve desired outcomes. This ordered creation of the program advantageously facilitates accurate interactions between solutions, aligns with the program's requirements, and ensures that the final program is constructed efficiently and effectively.

Additionally, creating the program comprises creating the new program in the selected order. This means that the program is built afresh, incorporating the solutions sequentially according to the predetermined order. For example, if Solution X is applied first and Solution Y is applied second, the new program is developed by integrating Solution X followed by Solution Y, in that specific sequence.

At step 712, the program is run. Running the program refers to deploying or executing the program via the computing device 102, 104. In such, running the program includes loading executable files pertaining to the program from the knowledge base 204 onto a temporary or executable memory. For instance, if the program is a desktop application, it might be loaded from a hard drive or SSD into the system RAM. In some instances, the program may be executed over the internet, such that it is deployed on a website associated with the enterprise/organization. In such instances, the program is hosted on a web server and accessed through the website associated with the enterprise or organization. For example, a web-based application like an online CRM system would be deployed on a server and accessed by users through their web browsers.

During execution, the one or more processors associated with the computing device 102, 104 process the program's instructions to perform specific tasks. This could involve, for example, processing user inputs on a form, performing calculations for a financial report, or generating data visualizations. If the program requires interactions with other software or hardware, such as accessing a database or communicating with a peripheral device, these interactions are managed during this phase. Once the program has completed its tasks or reached its end condition, it may perform necessary cleanup operations. This may include deallocating memory, closing network connections, and saving any changes to persistent storage. For instance, a database application may close its connection to the database and ensure that all transaction data is committed and saved.

Advantageously, the method 700 ensures that the new program is developed by prioritizing solution combinations based on their ability to meet high-priority requirements, leading to a focused and effective implementation.

Figure 8:
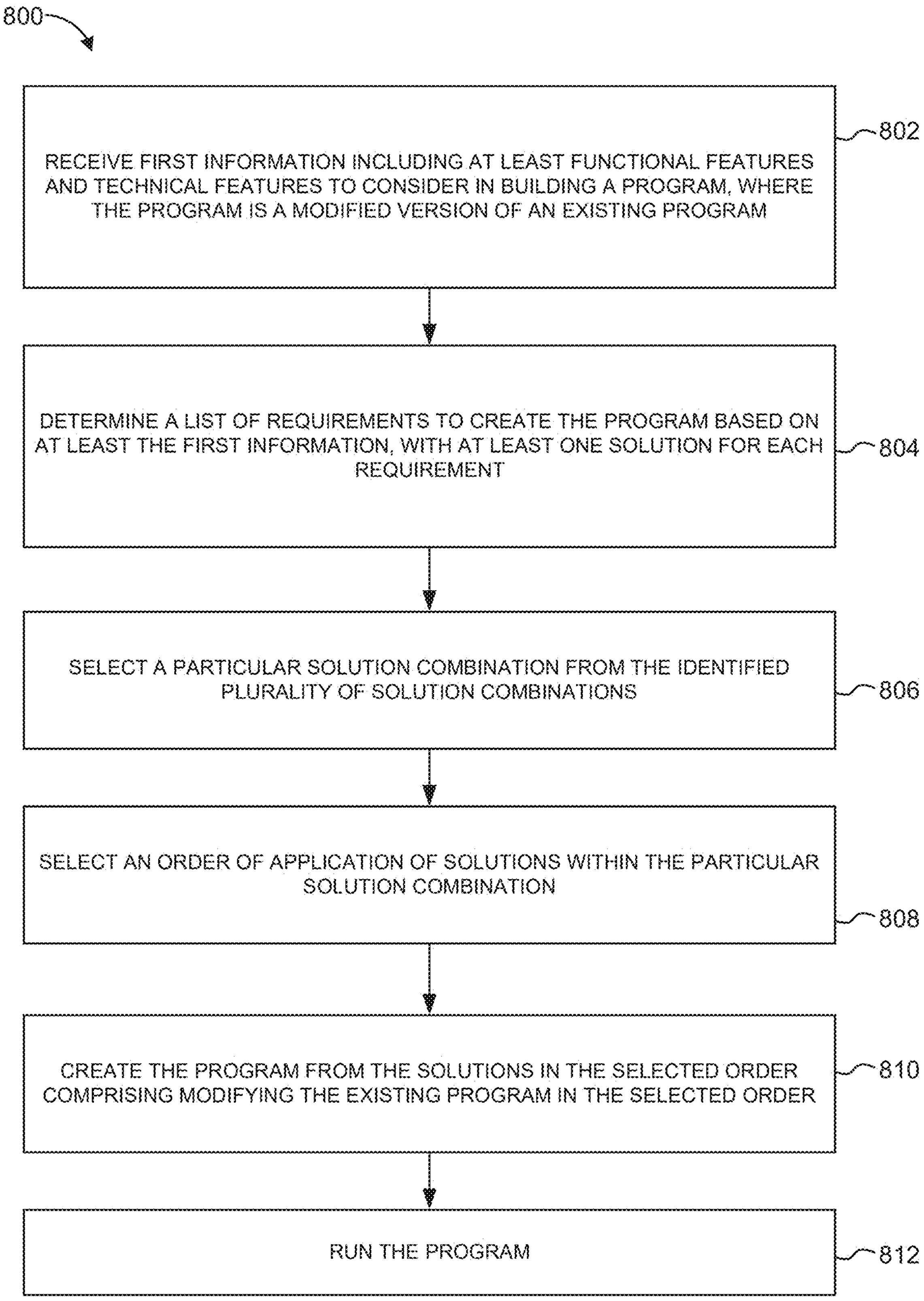
FIG. 8 is a flow diagram presenting another exemplary method in accordance with implementations of the present disclosure.

FIG. 8 is a flow diagram presenting another exemplary method 800 in accordance with implementations of the present disclosure. The exemplary method 800 pertains to a deployment instance implementation of the present disclosure, for building and running a modified version of an existing program. It will be appreciated that the method 800 is performed by the Gen AI model. The Gen AI model utilizes its trained capabilities to conduct each step of the method, ensuring that the operations are conducted efficiently and in accordance with the predefined parameters.

At step 802, first information including at least functional features and technical features to consider in modifying an existing program is received. The first information is received from the user associated with the system 114. For example, a developer may provide information about new features to be added or performance improvements to be made to the existing program. The user may provide the first information to the system 114 via the UI/UX module 206.

The functional features/requirements refer to specific functions that the modified program is to provide. Examples include adding new filtering capabilities, enhancing user personalization features, or updating cart verification functionalities. The technical features/requirements (also referred to as non-functional features/requirements) refer to operating parameters of the modified program. Examples include improved scalability to manage more users, enhanced performance for faster processing, or strengthened security measures.

At step 804, a list of requirements is determined to modify the existing program based on the first information. The list of requirements refers to the necessary changes or additions to the existing program. For example, if the existing program is a customer relationship management (CRM) system, the requirements may include adding new reporting features, improving data integration capabilities, or updating the user interface. The determination to modify the program comprises, with at least one solution for each requirement, a first identification of a plurality of solution combinations from the at least one solution for each requirement. This involves identifying various combinations of solutions that can address the new or updated requirements. For instance, for a requirement to enhance data integration, possible solutions might include integrating new APIs or upgrading data processing modules.

The first identification involves analyzing the solutions to determine all feasible combinations that can be derived from them. For example, if the requirement is to improve security, the solutions might include implementing new encryption algorithms or enhancing authentication mechanisms. Identifying involves enumerating all viable combinations of these solutions to find suitable modifications.

The first identification comprises a second identification of solution combinations that meet each of the requirements where solutions within the solution combinations do not conflict. This step ensures that the identified combinations do not have conflicting elements. For example, if one solution enhances user authentication while another changes the session management approach, the combinations are evaluated to ensure that these changes work harmoniously together.

Further, the determination to modify the program comprises, in the absence of identified solution combinations where the solutions within any of the solution combinations do not conflict, a third identification of solution combinations based on weighting assigned to the requirements. In such, the solution combinations include solutions from higher weighted requirements and exclude solutions from lower weighted requirements. For example, if improving performance is the requirement, Solution A has a weight of 8 and Solution B has a weight of 5, the system 114 selects Solution A over Solution B, as it represents a higher priority for addressing the performance improvement requirement.

At step 806, a particular solution combination is selected from the identified plurality of solution combinations. This involves evaluating the available solution combinations to determine the best fit for modifying the existing program based on the requirements. For example, the selection might focus on a combination that integrates new APIs and enhances security features, ensuring these modifications align with the existing architecture and objectives.

At step 808, an order of application of solutions within the particular solution combination is selected. This involves determining the sequence in which the solutions are applied to modify the existing program. For example, if one solution involves updating the database schema and another involves changing the user interface, the order ensures that the database updates are completed before the user interface changes are applied to avoid inconsistencies.

At step 810, the modified program is created from the solutions in the selected order. This involves integrating the solutions into the existing program according to the predetermined sequence. For example, if Solution A involves adding new functionality and Solution B involves updating existing features, the modified program is developed by incorporating Solution A first, followed by Solution B, to ensure proper integration of the new and updated features.

Additionally, creating the modified program comprises modifying the existing program in the selected order. This means that the existing program is updated by sequentially applying the solutions as determined, ensuring that the modifications align with the existing system and meet the new requirements. For example, if Solution X is applied first to enhance data security and Solution Y is applied second to improve performance, the existing program is updated with these changes in the specified order.

At step 812, the modified program is run. In some instances, running the program may comprise deploying or executing the updated program via the computing device 102, 104. This includes loading the modified program into memory and executing it to perform the updated tasks. For example, if the modified program is a web-based application, it might be deployed on a server and accessed through a web browser, ensuring that the updates are functioning as intended. During execution, the one or more processors associated with the computing device 102, 104 process the modified program's instructions to perform specific tasks. This includes handling user inputs, performing calculations, and managing interactions with other software or hardware as updated. For instance, the modified program might now include new features or improved performance that are assessed during this phase to ensure they work correctly.

Advantageously, the method 800 optimizes the modification of the existing program by prioritizing solutions based on their weight, ensuring that critical improvements are made efficiently while maintaining compatibility with existing structure of the program.

The above methodology provides a technical solution to the various technical problems of traditional methods. By first seeking solution combinations that lack conflicts and, if necessary, then resorting to weighting the requirements to resolve the conflict in favor of the higher weight requirements, the conflict resolution methodology minimizes conflicts between components of the program, thus removing potential points of inoperability or repair in the final program. Ordering the solutions in the solution combination ensures that the highest-priority solutions are effectuated first and supersede issues with lower-priority solutions.

The above methodology also provides a practical application in the form of the resulting created and executed program. As noted above, the program may be a newly created program or modification of an existing program. In either case, the program is then run to accomplish its underlying function.

Figure 9:
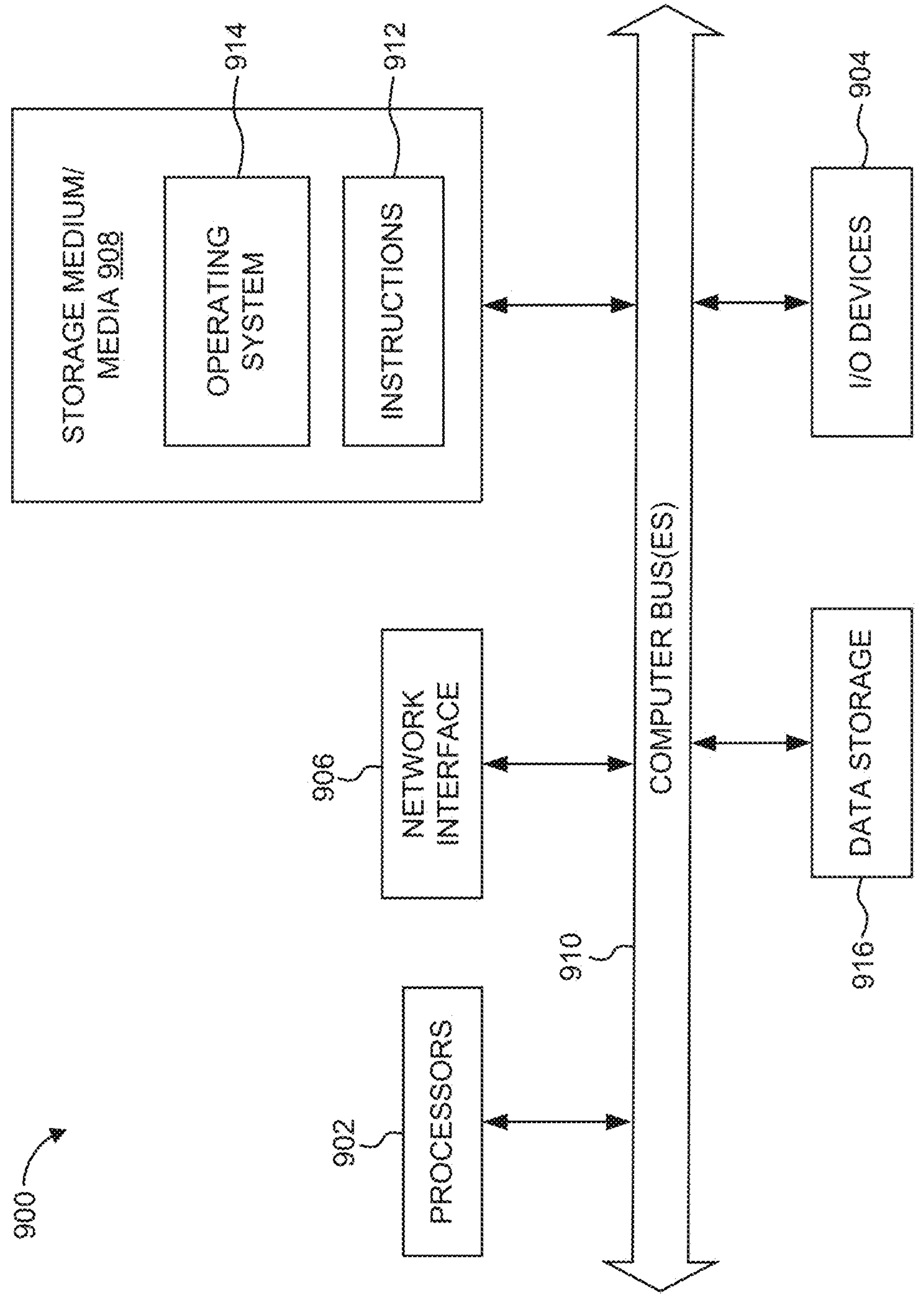
FIG. 9 illustrates a computer system that may be used to implement the knowledge system.

FIG. 9 illustrates a computer system 900 that may be used to implement the system 114. More particularly, computing machines such as desktops, laptops, smartphones, tablets, and wearables which may be used to process the conversational interactions in the system 114 may have the structure of the computer system 900. The computer system 900 may include additional components not shown and that some of the process components described may be removed and/or modified. In another example, a computer system 900 may be deployed on external-cloud platforms such as cloud, internal corporate cloud computing clusters, organizational computing resources, and/or the like.

The computer system 900 includes processor(s) 902, such as a central processing unit, ASIC or another type of processing circuit, input/output devices 904, such as a display, mouse keyboard, etc., a network interface 906, such as a Local Area Network (LAN), a wireless 902.11x LAN, a 3G or 4G mobile WAN or a WiMax WAN, and a processor-readable medium 908. Each of these components may be operatively coupled to a bus 910.

The computer-readable medium 908 may be any suitable medium that participates in providing instructions to the processor(s) 902 for execution. For example, the computer-readable medium 908 may be non-transitory or non-volatile medium, such as a magnetic disk or solid-state non-volatile memory or volatile medium such as RAM. The instructions or modules stored on the computer-readable medium 908 may include machine-readable instructions 912 executed by the processor(s) 902 that cause the processor(s) 902 to perform the methods and functions of the system 114.

The system 114 may be implemented as software stored on a non-transitory processor-readable medium and executed by the processors 902. For example, the computer-readable medium 908 may store an operating system 914, such as MAC OS, MS WINDOWS, UNIX, or LINUX, and code for the system 114. The operating system 914 may be multi-user, multiprocessing, multitasking, multithreading, real-time, and the like. For example, during runtime, the operating system 914 is running and the code for the system 114 is executed by the processor(s) 902.

The computer system 900 may include a data storage 916, which may include non-volatile data storage. The data storage 916 stores any data used or generated by the system 114. The network interface 906 connects the computer system 900 to internal systems for example, via a LAN. Also, the network interface 906 may connect the computer system 900 to the Internet. For example, the computer system 900 may connect to web browsers and other external applications and systems via the network interface 906.

What has been described and illustrated herein is an example along with some of its variations. The terms, descriptions, and figures used herein are set forth by way of illustration only and are not meant as limitations. Many variations are possible within the spirit and scope of the subject matter, which is intended to be defined by the following claims and their equivalents.

Implementations of the present disclosure provide significant technical improvements by addressing common inefficiencies in program development and modification. By prioritizing solution combinations based on high-priority requirements, the approach ensures that new programs are developed with a focus on effectiveness and alignment with critical needs. This results in optimized solutions, enhancing overall program performance and efficiency. Focusing on high-priority requirements enhances the effectiveness and efficiency of creating new programs, leading to substantial time and effort savings. This also reduces the reliance on subject matter experts, whose subjective assessments and unavailability may not always yield optimal results, or delay the creation of the program.

Additionally, the approach for modifying existing programs optimizes the update process by prioritizing changes based on their impact and relevance. This reduces the risk of conflicts and inefficiencies that can occur with less structured approaches. Consequently, the modification process becomes more streamlined and effective, improving the performance and compatibility of the updated program while minimizing potential issues. This results in reduced time and effort for program modifications and lessens the dependency on expert intervention, effectively addressing challenges related to manual adjustments and outdated system architectures.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products (i.e., one or more modules of computer program instructions encoded on a computer readable medium for execution by, or to control the operation of, data processing apparatus). The computer readable medium may be a machine-readable storage device, a machine-readable storage substrate, a memory device, a composition of matter effecting a machine-readable propagated signal, or a combination of one or more of them.

The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code that constitutes processor firmware, a protocol stack, a database management system, an operating system 914, or any appropriate combination of one or more thereof). A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand-alone program or as a module, component, subroutine, or other unit suitable for use in a computing environment. A computer program does not necessarily correspond to a file in a file system.

A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random-access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks).

However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media, and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display) monitor) for displaying information to the user and a keyboard and a pointing device (e.g., a mouse, a trackball, a touchpad), by which the user may provide input to the computer. Other kinds of devices may be used to provide for interaction with a user as well; for example, feedback provided to the user may be any appropriate form of sensory feedback (e.g., visual feedback, auditory feedback, tactile feedback); and input from the user may be received in any appropriate form, including acoustic, speech, or tactile input.

Implementations may be realized in a computing system that includes a back end component (e.g., as a data server), a middleware component (e.g., an application server), and/or a front end component (e.g., a client computer having a graphical user interface or a Web browser, through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination.

Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

EXEMPLARY IMPLEMENTATION

In the exemplary implementation, the Gen AI model receives the first information comprising the user's problems and/or requirements. The first information comprises the following:

- Tight coupling of architecture and frequent application updates: Architecture's tight integration complicates changes, frequent patching suggests a reactive maintenance approach, and the like.
- Lack of observability in architecture: Absence of tools for real-time monitoring, difficulty in issue identification and diagnosis, and the like.
- Online system availability impacted by tight coupling: Higher risk of system failures, changes in one component affect others, reducing availability, and the like.
- Performance degradation from database and logic issues: Database inefficiencies affect performance, poor logic implementation leads to slowdowns, optimization needed for improved performance, and the like.

From the first information, the Gen AI model identifies a list of program requirements and potential solutions. By way of non-limiting example, the list of program requirements include-architecture choices, database choices, operational techniques, reliability, performance, and the like.

Corresponding to the program requirements, the list of potential solutions includes, for architecture solutions, choices like basic web application, event driven application, microservices (for example, ASP.NET MVC Application, DB SQL Server, LINQ, ADO.NET), technology components like the framework to be used, messaging platform. Similarly, for database solutions, the list of potential solutions includes choices like local database, cloud database, Azure SQL, cosmos DB, and the like.

For operational techniques, the list of potential solutions includes observability logs (for example, log 4NET, Azure AppInsights), CPU, Storage, Security & compliance, adherence to standards, and the like. For reliability, the list of potential solutions includes disaster recovery, availability by zone/region, application recovery, database backup, server backup, and the like. Additionally, for performance, the list of potential solutions includes number of requests, response time, number of users, concurrent users, and the like.

The Gen AI model then generates solution combinations, including a solution that meets each requirement. In such, if requirement A has solution A1 while requirement B has solutions B1 and B2, then (presuming no conflicts) two possible solution combinations would be A1/B1, A1/B2. For example, if architecture requirement has solution microservices architecture, and observability logs requirement has solutions log 4NET and Azure AppInsights, the two possible solution configurations may be microservices architecture with log 4NET, and microservices architecture with Azure AppInsights.

Specific solutions may be in conflict, and thus the AI model may limit its response to solution combinations that lack such conflicts. Based on the above, if A1 and B2 are in conflict, then the AI model would identify the solution combination of A1/B1. The solution combination of A1/B2 was not included because it contains the noted conflict. For example, considering the two possible solution configurations as microservices architecture with log 4NET, and microservices architecture with Azure AppInsights; if microservices architecture conflict with Azure AppInsights, then this solution combination is not considered.

There may be no available solution combination that lacks conflicts. For example, if A1 conflicts with B1 and B2, then there is no conflict-free solution combination. Then, the AI model enters a conflict resolution mode. In this mode, weights of the requirements are either assigned or recalled as previously assigned. Conflicts are then resolved by giving higher priority to the requirement with higher weight.

Suppose requirement A has a weight of 2, while requirement B has a weight of 1. Since A has a higher weight, then A1 is selected for the solution while B1 and B2 are excluded. A solution combination with A1 would be provided, preferably with a notation that the solution combination does not include a solution for B. Users could accept the solution combination (imperfect as it may be) and/or would have the opportunity to change the weighting or the requirements and rerun the methodology.

For example, if B1 (log 4NET) has Cost 5, Carbon Emissions 2, Maintainability 5, Productivity 2, Performance 5, Reliability 5, and B2 (Azure AppInsights) has have Cost 3, Carbon Emissions 3, Maintainability 4, Productivity 4, Performance 3, Reliability 4; since the user's requirements are oriented toward performance and reliability, the solution combination of A1/B1, which is microservices architecture with log 4NET may be selected.

In some cases, requirements can have even weighting, which would not resolve the conflict. The AI generator can then provide alternative options, giving priority to one of the equally weighted requirements. Thus, in the example above, if requirements A and B had the same priority, there would be a first solution combination with A1 that excludes B1 and a second solution combination with B1 that excludes A1, and a third solution combination with B2 that excluded A1. Users could accept the desired solution combination (imperfect as it may be) and/or would have the opportunity to change the weighting or the requirements and rerun the methodology.

Thereafter, the Gen AI model may utilize prediction techniques to measure possible solutions vis-à-vis KPIs based on the user requirements to rate and rank an overall solution combination. For example, for A1/B1, the overall solution may be ranked as 5 for learning curve, 4 for carbon emissions, 4 for maintainability, and 1 for programmer productivity. Similarly, solution A/B2, the overall solution may be ranked as 5 for learning curve, 3 for carbon emissions, 5 for maintainability, and 2 for programmer productivity.

Thereafter, the Gen AI model may implement a solution based on the ranking on various aspects and relevant user-defined KPIs. Alternatively, the Gen AI model may provide the identified solution combinations to the user for selection. Once selected, the Gen AI model builds and executes the program based on the solution combination.

EXPERIMENTAL PART

A test simulation for the aforementioned system was performed in light of presently available prior arts. Based on the test simulation, it was observed that the present disclosure provides significant advantages over the prior arts. Notably, the prior arts implemented manual efforts to identify and implement program architectures, which are automated in the present disclosure. The following table provides an approximate assessment of the advantages being provided by the system of the present disclosure:

TABLE 1

Comparative analysis of prior arts and the system of the present disclosure based on the test simulation.

| Features | Prior Arts | Present Disclosure |
|---|---|---|
| Operational efficiency/Maintainability | Approximately 3 hours per program | Approximately 1.5-2 hours per program |
| Performance Efficiency | Approximately 200 requests per second | Approximately 270-300 requests per second |
| Programmer Productivity | 1800 LOC per day | 2700-3150 LOC per day |
| Resolution Cost | Approximately 100,000 USD | Approximately 50,000-70,000 USD |

As shown in Table 1, development effort and maintenance costs decrease by 35 to 50%, contributing to increased indirect revenue through new innovations; performance of the program improves by 35-40% due to optimization in algorithms, adoption of decoupled architecture, and the like; memory and compute consumption experience enhancements of 20 to 30% due to optimized algorithms, microservices architecture, and the like; application reliability and code efficiency see significant improvements of 30 to 40%; programmer and project productivity witness a notable increase of 50 to 75%; and cost involvements are optimized by 30 to 50%.

What is claimed is:

1. A method, comprising:

receiving first information including at least functional features and technical features to consider in building a program;

determining, by a Gen AI model based on at least the first information, a list of requirements to create the program with at least one solution for each requirement;

first identifying, by the Gen AI model, a plurality of solution combinations from the at least one solution for each requirement, comprising:

second identifying solution combinations that meet each of the requirements where solutions within the solution combinations do not conflict;

in the absence of identified solution combinations where the solutions within any of the solution combination do not conflict;

third identifying solution combinations based on weighting assigned to the requirements, such that the solution combinations include solutions from higher weighted requirements and exclude conflicting solutions from lower weighted requirements;

receiving a selection of a particular solution combination from the identified plurality of solution combinations;

selecting an order of application of solutions within the particular solution combination;

creating the program from the solutions in the selected order; and running the program.

2. The method of claim 1, wherein the program is a new program, and the creating a program comprises creating the new program in the selected order.

3. The method of claim 1, wherein the program is a modified version of an existing program, and the creating a program comprises modifying the existing program in the selected order.

4. The method of claim 3, further comprising:

receiving second information on historical operations of the existing program;

the determining comprises determining, by the Gen AI model, based on at least the first and second information, a list of requirements to meet to modify the existing program with at least one solution for each requirement;

the running the program comprises running the existing program as modified.

5. The method of claim 1, further comprising between the first identifying and the receiving:

predicting an impact of each of the identified solution combinations against performance indicators in the second information.

6. The method of claim 5, further comprising between the predicting and the receiving:

ranking the order of the identified solution combinations based on the predicting.

7. The method of claim 1, further comprising between the receiving and the determining:

converting the first information into a format that can be processed by the Gen AI model.

8. A non-transitory computer readable medium storing instructions programmed to cooperate with electronic computer hardware in combination with software to perform operations, comprising:

receiving first information including at least functional features and technical features to consider in building a program;

determining, by a Gen AI model based on at least the first information, a list of requirements to create the program with at least one solution for each requirement;

first identifying, by the Gen AI model, a plurality of solution combinations from the at least one solution for each requirement, comprising:

second identifying solution combinations that meet each of the requirements where solutions within the solution combinations do not conflict;

in the absence of identified solution combinations where the solutions within any of the solution combination do not conflict;

third identifying solution combinations based on weighting assigned to the requirements, such that the solution combinations include solutions from higher weighted requirements and exclude conflicting solutions from lower weighted requirements;

receiving a selection of a particular solution combination from the identified plurality of solution combinations;

selecting an order of application of solutions within the particular solution combination;

creating the program from the solutions in the selected order; and running the program.

9. The non-transitory computer readable medium of claim 8, wherein the program is a new program, and the creating a program comprises creating the new program in the selected order.

10. The non-transitory computer readable medium of claim 8, wherein the program is a modified version of an existing program, and the creating a program comprises modifying the existing program in the selected order.

11. The non-transitory computer readable medium of claim 10, the operations further comprising:

receiving second information on historical operations of the existing program;

the determining comprises determining, by the Gen AI model, based on at least the first and second information, a list of requirements to meet to modify the existing program with at least one solution for each requirement;

the running the program comprises running the existing program as modified.

12. The non-transitory computer readable medium of claim 8, the operations further comprising between the first identifying and the receiving:

predicting an impact of each of the identified solution combinations against performance indicators in the second information.

13. The non-transitory computer readable medium of claim 12, the operations further comprising between the predicting and the receiving:

ranking the order of the identified solution combinations based on the predicting.

14. The non-transitory computer readable medium of claim 8, the operations further comprising between the receiving and the determining:

converting the first information into a format that can be processed by the Gen AI model.

15. A system, comprising:

non-transitory computer readable media storing instructions programmed to cooperate with electronic computer hardware in combination with software to perform operations, comprising:

receiving first information including at least functional features and technical features to consider in building a program;

determining, by a Gen AI model based on at least the first information, a list of requirements to create the program with at least one solution for each requirement;

first identifying, by the Gen AI model, a plurality of solution combinations from the at least one solution for each requirement, comprising:

second identifying solution combinations that meet each of the requirements where solutions within the solution combinations do not conflict;

in the absence of identified solution combinations where the solutions within any of the solution combination do not conflict:

third identifying solution combinations based on weighting assigned to the requirements, such that the solution combinations include solutions from higher weighted requirements and exclude conflicting solutions from lower weighted requirements;

receiving a selection of a particular solution combination from the identified plurality of solution combinations;

selecting an order of application of solutions within the particular solution combination;

creating the program from the solutions in the selected order; and running the program.

16. The system of claim 15, wherein the program is a new program, and the creating a program comprises creating the new program in the selected order.

17. The system of claim 15, wherein the program is a modified version of an existing program, and the creating a program comprises modifying the existing program in the selected order.

18. The system of claim 17, the operations further comprising:

receiving second information on historical operations of the existing program;

the determining comprises determining, by the Gen AI model, based on at least the first and second information, a list of requirements to meet to modify the existing program with at least one solution for each requirement;

the running the program comprises running the existing program as modified.

19. The system of claim 15, the operations further comprising between the first identifying and the receiving:

predicting an impact of each of the identified solution combinations against performance indicators in the second information.

20. The system of claim 19, the operations further comprising between the predicting and the receiving:

ranking the order of the identified solution combinations based on the predicting.

* * * * *